Sept. 12, 1933.     K. JUNG     1,926,151
TELESCOPIC GUN SIGHT MOUNTING
Filed July 25, 1932     5 Sheets-Sheet 1

Inventor:
Karl Jung
By Sommers + Young
Attys.

Sept. 12, 1933.   K. JUNG   1,926,151
TELESCOPIC GUN SIGHT MOUNTING
Filed July 25, 1932   5 Sheets-Sheet 2

Inventor:
Karl Jung,
By Sommers & Young
Attys.

Sept. 12, 1933.　　　　K. JUNG　　　　1,926,151
TELESCOPIC GUN SIGHT MOUNTING
Filed July 25, 1932　　　5 Sheets-Sheet 4

Inventor:
Karl Jung
By Sommers & Young
Attys.

Sept. 12, 1933.     K. JUNG     1,926,151

TELESCOPIC GUN SIGHT MOUNTING

Filed July 25, 1932     5 Sheets-Sheet 5

Patented Sept. 12, 1933

1,926,151

UNITED STATES PATENT OFFICE 1,926,151

TELESCOPIC GUN SIGHT MOUNTING

Karl Jung, Munich, Germany, assignor of one-half to Walo Nicolaus Gerber, Zurich, Switzerland Application July 25, 1932, Serial No. 624,576, and in Germany April 11, 1932

18 Claims. (Cl. 33—50)

The present invention relates to a prismatic sighting telescope with fixed graticule and having its holder adjustably mounted on a supporting rail.

The sighting telescopes employed at the present time for fire-arms are generally terrestrial telescopes with a movable graticule. The prismatic sighting telescopes constructed heretofore likewise with a movable graticule, very soon disappeared from the market, because the loosening of the prisms rapidly affected the adjustment of the telescopes.

Both types of telescope also suffer from the disadvantage that, due to the "kick" of the firearm, they have to be employed at a distance of about 60 millimetres from the eye in order to avoid injury to the eye.

In terrestrial telescopes, therefore, it is necessary to keep a very exact sighting point because otherwise what are known as "half-moon shadows" appear in the field of view, resulting in shots missing the target. The fact that this sighting point has to be kept exactly demands close attention on the part of the marksman and renders it extraordinarily difficult to fire at rapidly moving targets. In prismatic telescopes employed at a distance of about 60 mm. from the eye, the field of view is excessively restricted unless, after the pattern of the known prismatic sighting telescope of Carl Zeiss, Jena, a very bulky prismatic telescope with a special ocular is constructed, with which, however, shadows also appear in the field of view if a very exact sighting point is not maintained.

In all the above-mentioned types, the use of the telescopes for long distance work, that is to say more particularly for military purposes, is considerably hindered by the movable graticule which, due to the use of micrometer screws, is very sensitive and only allows of an elevation for moderate distances.

This disadvantage is obviated in the prismatic sighting telescope according to the invention by the fact that the telescope holder, which is pivotally mounted in known manner on a pivot on the supporting part, is connected to the said supporting part by a supporting pin parallel to the pivot, the said supporting pin being so moved relatively to guiding surfaces of the telescope holder that the part of the telescope holder bearing the guiding surfaces is displaced at right angles to the said guiding surfaces and the telescope holder is thereby turned.

Due to this arrangement, the inclination of the optical axis is obtained without the use of micrometer screws which would rapidly be sheared in the case of firearms with a heavy "kick" and also without the use of worm gears or other complicated and sensitive devices.

The arrangement may either be such that an eccentric pin mounted in the supporting part is mounted with its eccentric portion in a guide slot of the telescope holder and is rotated therein, or a pin mounted in a longitudinal slot of the telescope holder is longitudinally displaced with its end stud in longitudinal slots in the supporting part, which are inclined to the first-mentioned slot.

Constructional examples of the invention are shown by way of example in the accompanying drawings, in which.

Figure 1:
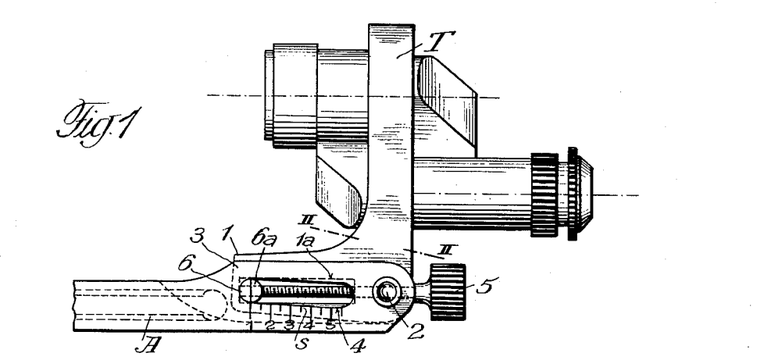
Fig. 1 shows a first construction in side elevation.
Figures 2, 3, 4:
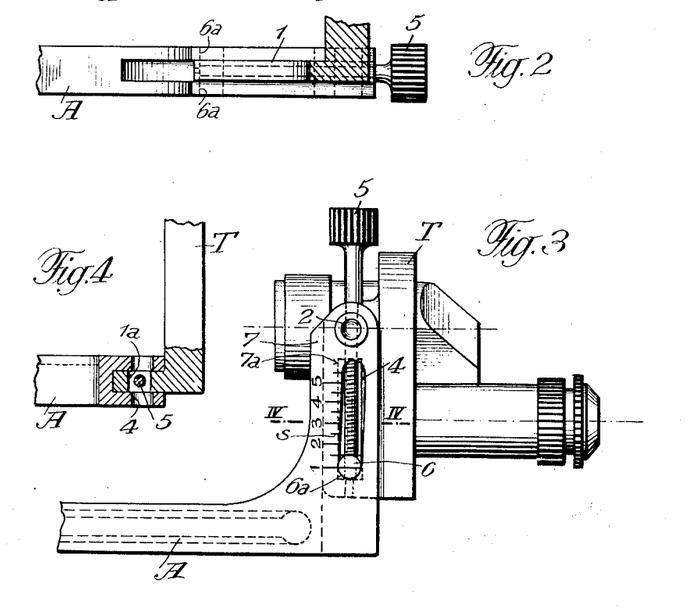
Fig. 2 is a plan in part section along the line II—II in Fig. 1.
Fig. 3 shows a second construction in side elevation.
Fig. 4 shows a section along the line IV—IV in Fig. 3.

In the first construction shown in Figs. 1 and 2, the telescope holder T has a foot 1 which is bent forward at right angles (parallel to the optical axis) and which, being rotatable about the pivot 2, is mounted between the guide 3 of the supporting rail A which is provided with a dovetail groove. The foot 1 is provided with a guide slot 1a passing through it and lying exactly parallel to the optical axis of the telescope. In the guides 3 of the supporting rail A are corresponding guide slots 4 with rounded ends, but these slots 4 are inclined rearwardly (towards the butt end of the fire-arm). This inclination bears a certain relationship to the curve of the projectile trajectory.

The driving spindle 5 running centrally in the guide slot 1a and journalled in the foot 1 (the pivot 2 being bored through), is provided in the length of the slot 1a with an external screwthread on which is mounted the driving element 6 with the studs 6a, one of which is provided with a reference mark. The studs 6a lie on a common axis which is parallel to the pivot 2. A scale s adapted to the particular requirements is provided along the outer guide slot 4.

If now the driving spindle 5 is rotated, the studs 6a of the driving element 6 slide to or fro in the slots 1a and 4 and effect a displacement or coincidence of the guide slot 1a, situated in the telescope foot 1 and extending exactly parallel to the optical axis of the telescope relatively to the oblique slide slots 4 which are provided in the guides 3 and are divergent to the said slot 1a. The entire telescope is thereby inclined relatively to the gun barrel. By means of the scale s provided along the outer guideway and the mark on the stud 6a, it is possible to read the inclination or the degree of elevation which has been made at the time.

Figure 5:
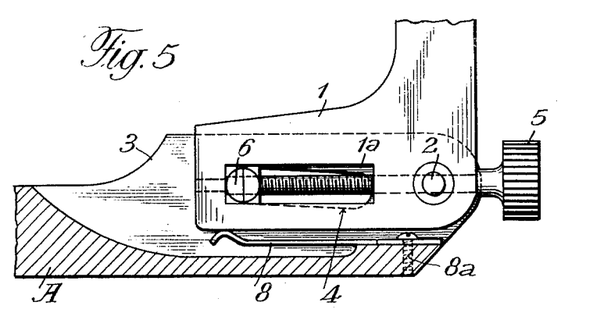
Fig. 5 shows in side elevation a modification of the construction according to Fig. 1
Figure 6:
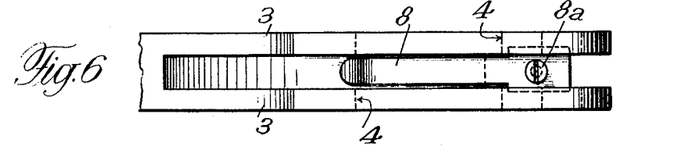
Fig. 6 is a plan thereof.

The slight play required for the movement of the stud of the pin 6 in the guide slots 4, however, causes some displacement of the cone of fire at long ranges, and vertical dispersion of the shots is therefore produced. In order to elimiante this play and to obtain maximum accuracy of the position of the hits, a flat spring 8 is provided between the guides 3, as shown in Fig. 5 in longitudinal section (one of the guides having been removed) and in plan in Fig. 6. The spring is inserted in a groove in the supporting rail A and is fixed by means of a screw 8a. Its free end is provided with a nose and presses against the lower side of the foot 1, whereby the play is permanently eliminated.

Figure 7:
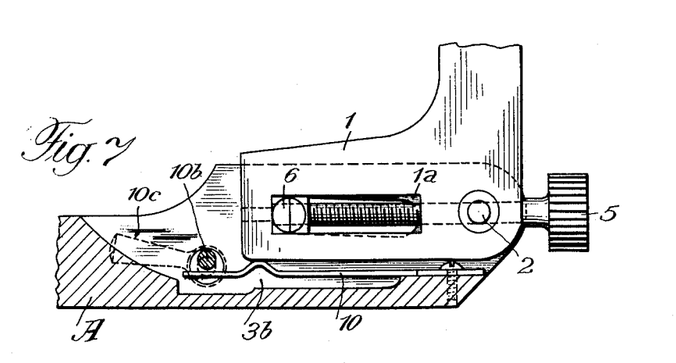
Fig. 7 shows in side elevation another modification of the construction according to Fig. 1.

When it is desirable to obtain an intentional vertical dispersion of the shots, while retaining the same aiming point, a flat spring 10, mounted as described above, is provided between the guides 3, the said spring being extended, however, beyond the spring nose which bears against the foot 1, as shown in Fig. 7 (side elevation with one of the guides removed). An eccentric pin 10b mounted in the guides 3 is adapted to be rotated by means of a catch 10c. According to the position of the said catch, the spring 10 is either released, so that it presses against the telescope foot 1 and elimiantes the play, or it is pressed into a recess 3b in the supporting rail, so that the foot 1 is free, whereby a vertical dispersion within narrow limits is obtained.

Fig. 3 shows another construction of the invention. In this construction, the whole of the adjustment device is disposed at right angles to the optical axis, the guides 7 of the supporting rail A being bent upwards at right angles. In other respects, the same reference numerals refer to the same parts as in Figs. 1 and 2.

Fig. 4 is a section taken along the line IV—IV in Fig. 3. This figure shows the displacement of the slots 1a and 4 relatively to one another when the reference line on the driving element 6 is against the scale division 1 (Fig. 3). The slots coincide when the reference line is adjusted to the scale division 3 and their divergence is opposite to that shown in Fig. 4 when the reference mark is adjusted to the scale division 5.

Of course, the adjusting device need not be disposed horizontally or vertically, but may be provided in any position which is inclined to the optical axis.

The entire arrangement provides a strong and robust construction. Great stability is ensured by the long guiding surfaces of the telescope foot in the guides of the supporting rail and by the very robust driving element. Due to the length of the guide part and of the slots, it is also possible to provide a distinct and wide scale, thereby facilitating easy and accurate reading of the adjusted elevation.

Figures 8, 9, 10, 11:
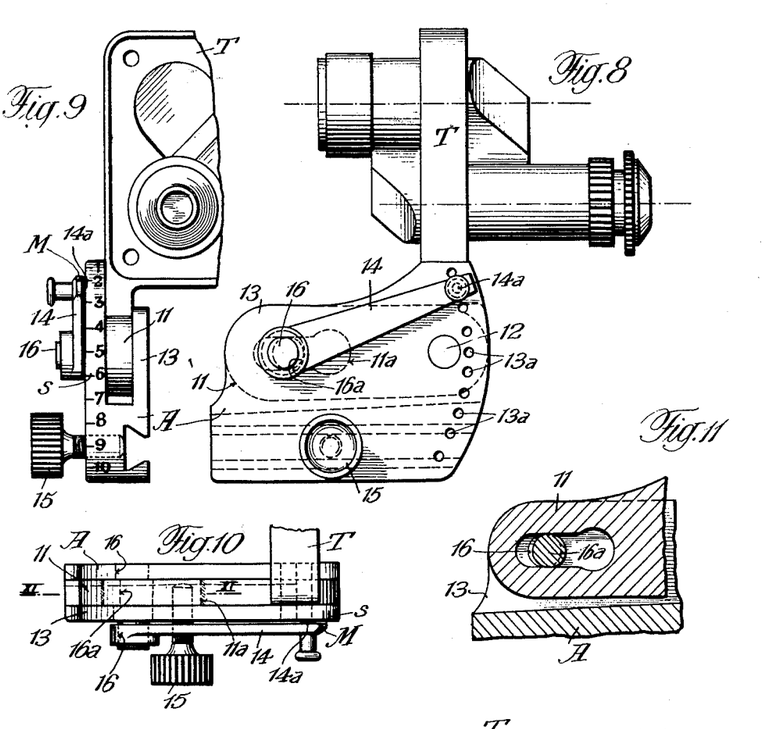
Fig. 8 shows a third construction in side elevation.
Fig. 9 shows a view looking towards the eyepiece.
Fig. 10 shows a plan.
Fig. 11 a section along the line XI—XI in Fig. 10.

In the construction shown in Figs. 8 to 10, the telescope holder T has a foot 11 which is bent forward at right angles (parallel to the optical axis). The said foot is rotatable about the pivot 12 and is mounted between the guides 13 of the supporting rail A which is provided with a dovetail groove. At the end opposite to the pivot 12, the foot 11 has a short straight guide slot 11a which is likewise exactly parallel to the optical axis of the telescope. The cylindrical adjusting pin 16 is rotatably mounted in the guides 13 of the supporting rail A and its cylindrical middle portion 16a, which is situated in the guiding slot 11a, is off-set eccentrically. The degree of eccentricity of the pin portion 16 to the middle portion 16a of the pin bears a certain relationship to the curve of the projectile trajectory.

The adjusting pin 16 is rotated by means of the lever 14 carrying at its free end a spring mounted catch pin 14a. Holes 13a equal in diameter to the diameter of the catch pin 14a and corresponding to the various ranges are provided on the outer guide 13 along the edge opposite to the bearing of the pin 16. The distances between the holes 13a are dependent upon the elevations required for the various ranges, that is to say, they are also dependent upon the curve of the projectile trajectory. A scale s, provided with the range numbers corresponding to the holes 13a, is provided on the end face of the outer guide 3, while the lever 14 carries a reference mark M on its end edge. The clamping screw 15 is for clamping the supporting rail of the telescope to the weapon. The straight guide slot 11a is provided with a circular widened portion at one end (Fig. 11) in order to facilitate the introduction of the adjusting pin 16 during assembly.

If, now, the adjusting pin 16 and with it its eccentric middle portion 16a is rotated through a certain amount by the lever 14, the resulting rotation or the displacement of the eccentric portion 16a of the pin in the guide slot 11 a lying exactly parallel to the optical axis, causes the telescope foot 11, rotatable about the pivot 12, to be raised or lowered in the supporting rail, and hence causes the entire telescope to be inclined relatively to the gun barrel.

The elevation is adjusted by rotating the lever 14 with the catch pin 14a retracted until it is over the bore 13a corresponding to the desired range, whereupon the catch pin 14a springs into the said hole. This ensures a reliable fixing of the adjusting pin 16 in its correct position. Figures 8 and 9, for example, show the elevation adjusted for a range of 200 metres.

Due to the provision of the scale s on the end face of the outer guide 13, the said scale lies immediately in the direction of view of the aiming marksman, so that it is possible for the latter to adjust and check the elevation conveniently and rapidly during firing.

Figures 12, 13:
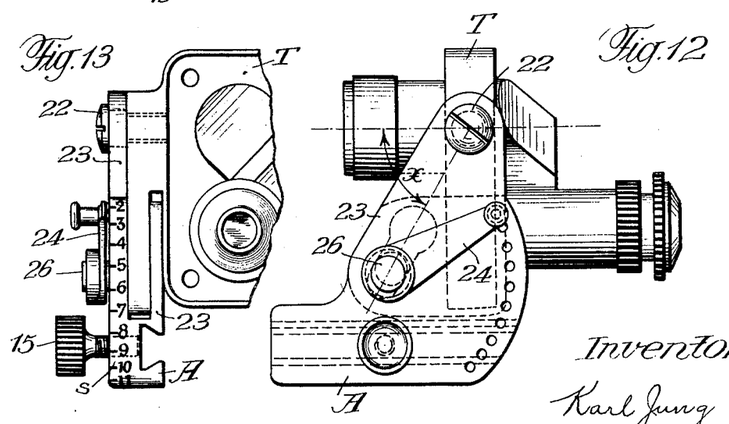
Fig. 12 shows a fourth construction in side elevation.
Fig. 13 is a view looking toward the eyepiece.

In the construction shown in Figures 12 and 13, the entire adjusting device is arranged at an angle x to the optical axis, thereby permitting a substantially more compact construction of the entire telescope. The guides 23 of the supporting rail A are extended upwardly. The point of rotation of the telescope holder T about the pivot 22 is on a level with the horizontal axis of the objective. The working and the operation of the adjusting device by means of the adjusting pin 26 and the adjusting lever 24 are the same as in the preceding construction.

Figures 14, 15:
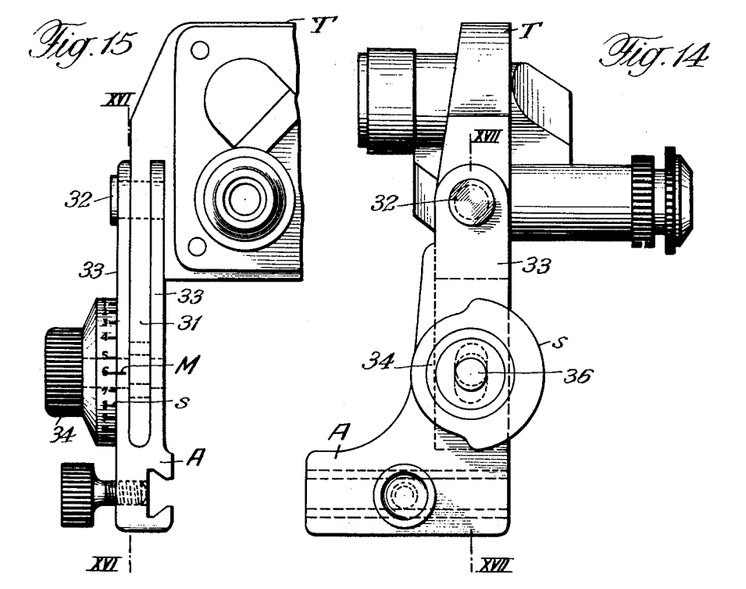
Fig. 14 shows a fifth construction in side elevation.
Fig. 15 shows a view looking toward the eyepiece.

In the construction shown in Figures 14 and 15, the guides 33 of the supporting rail A are bent upwardly at right angles, and the entire adjusting device is perpendicular to the optical axis. The point of rotation of the telescope holder about the pivot 32 is situated on a level with the horizontal axis of the eyepiece.

The adjusting pin 36 is rotated by means of an adjusting knob 34 bearing on its edge facing the observer the scale s with the range numbers. The reference mark M is provided on the end face of the outer guide 33. The elevation is adjusted by means of the scale s and the reference line M. The adjusting knob 34 may be fixed in any desired manner, for example, by means of a spring catch or the like (not shown in the drawings).

The action of this adjusting device is the same as in the previously described constructions.

Figure 16:
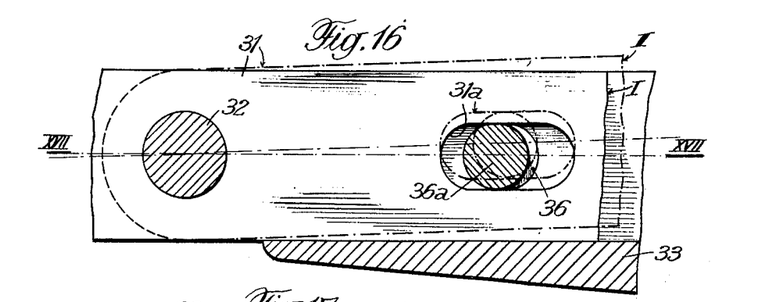
Fig. 16 shows on a larger scale a horizontal longitudinal section along the line XVI—XVI in Fig. 15

Figure 16 shows on a larger scale a horizontal longitudinal section along the line XVI—XVI in Figure 15 with the outer guide removed, and shows the displacement of the telescope foot 31 relatively to the guides 33 of the supporting rail. On rotating the adjusting pin 36, the eccentrically offset middle portion 36a thereof co-operates with the guide slot 31a to effect a raising or inclination of the foot 31 about the pivot 32. The foot 31 thus passes from the position I into the position II (shown in chain lines).

Figure 17:
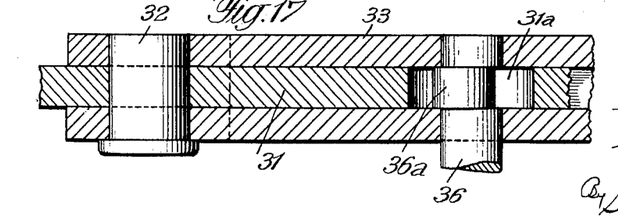
Fig. 17 shows on a larger scale a horizontal cross-section along the line XVII—XVII in Figs. 14 and 16.

Figure 17, also on a larger scale, is a horizontal cross-section through the telescope foot 31 and guides 33 along the line XVII—XVII in Figures 14 and 16. The cylindrical pin 36 with its eccentrically off-set middle portion 36a assumes the same position as in Figure 16.

Due to the long guiding surface of the telescope foot in the guides of the supporting rail and to the robust adjusting pin, the adjusting device according to the invention ensures great stability. The construction is very simple and strong, due to the absence of any screwthreads. In addition, the enclosed form of construction provides the maximum possible security against dirt, the appliance being thereby adapted to the requirements of field use. The provision of the distinct scale in the direction of view of the marksman enables the latter to adjust and control the elevation very quickly during firing.

In order to facilitate simple adjustment of the sighting telescope, the optical part of the sighting telescope is movably mounted in a fixed frame. The device shown in Figures 18 to 25 is employed for adjusting the optical part.

Figure 18:
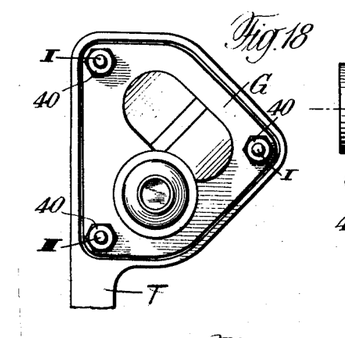
Fig. 18 shows an adjusting device, looking towards the eyepiece.
Figure 19:
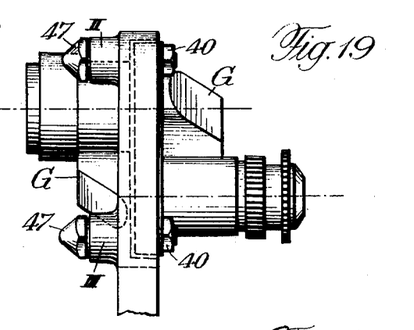
Fig. 19 shows a side elevation thereof.

As shown in Figure 18, the casing G enclosing the optical system is movably mounted in the telescope holder T by means of the three bearing points I, II and III.

Figures 20, 21, 22, 23, 24, 25:
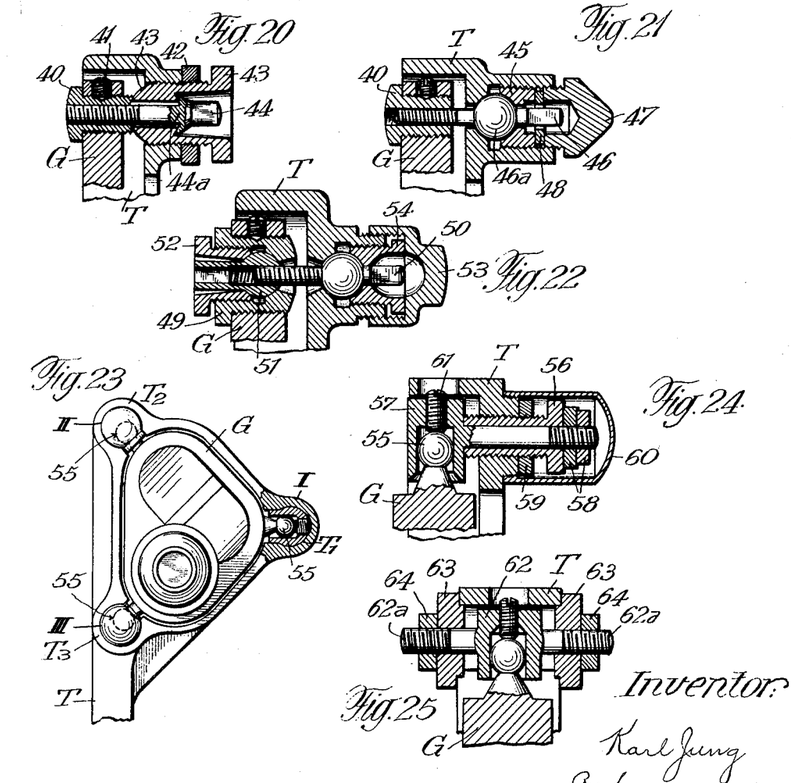
Figs. 20, 21 and 22 show different detail modifications in section.
Fig. 23 shows another construction thereof looking towards the eyepiece.
Fig. 24 shows details in section.
Fig. 25 shows another modification thereof in section.

According to Figure 20, the internally screw-threaded bush 40 is screwed into the casing G. On its inner end the said bush has a concave bearing seat and it is secured in position by means of the screw 41. Mounted in the telescope holder T is the bush 43 which is secured by means of the lock nut 42 and has its end in the form of a part of a sphere. The casing G is connected to the telescope holder T by means of the square-ended screw 44 which fits loosely in the bush 43 and is screwed by its thread into the bush 40, while bearing with its concave collar 44a on the inner spherical surface of the bush 43. The concave bearing surface of the bush 40 is thereby pressed on the convex bearing surface of the bush 43. All three bearing points I, II and III are constructed in this form.

The bearing points are made concave or convex in order to eliminate any distortion of the optical body and the accompanying stresses which may occur during adjustment.

The fitting and adjusting of a telescope thus constructed is carried out as follows:

The parts which are to be attached to the barrel of the weapon and which carry the telescope, such as a dovetail-shaped bearing rail, are mounted in series without any regard to their exact parallel location with respect to the gun barrel. After sliding the telescope on the bearing rail, the optical system with the graticule is now adjusted axially parallel to the barrel by means of the three spherical adjusting screws. In accordance with the cone of fire obtained by firing, the aiming tip is also brought into line with the middle of the cone by means of the three spherical screws.

The actual adjustment of the optical system is carried out as follows. After slackening the three lock nuts 42 and loosening the three square-ended screws 44 of all the three bearing points I, II and III, the three bushes 43 are screwed in or out in the telescope holder T until the tip of the graticule stands at the desired point. The three screws 44 and the three lock nuts 42 are then tightened up again.

Actuation of the bearing point I (Figures 18 and 19) effects an adjustment of the telescope and casing G in a horizontal plane about a vertical axis, that is to say, the tip of the graticule travels from left to right or from right to left. Actuation of the bearing points II or III permits an adjustment of the telescope and casing G about either a vertical or horizontal axis or both, that is to say, the aiming tip may thereby be moved either vertically or horizontally. By combined actuation of the three adjusting screws, it is possible to effect a diagonal adjustment of the optical system.

The construction shown in Figure 21 has the same bush 40 in the casing G as shown in Figure 20, but the bush 45 in the telescope holder T is considerably shorter and is ground concave at the end facing the casing G. The telescope holder T is likewise provided with a concave seat for the spherical collar 46a on the square-ended screw 46 which is screwed by its threaded portion in the bush 40. The lock nut 47 is made in the form of a protective cap. Rotation of the bush 45 is prevented by the washer 48.

After removal of the protective cap 47, the adjusting device is actuated in the same way as in the construction described in the foregoing.

Figure 22 shows a double ball mounting which is particularly adapted for extreme positions of the optical system, since distortion and stresses of the adjusting screws are completely eliminated. The part of the adjusting device fitting in the telescope holder T is constructed in substantially the same way as that shown in Figure 21. The bush 49 in the casing G, however, is provided with a concave seat for the spherical nut 51 which is mounted on the square-ended screw 50 and which is secured by the likewise concave lock nut 52. The protective cap 53 is adapted to be screwed on an external thread.

In this construction, adjustment is also effected, after removal of the protective cap 53 and slackening the bush 54 and the lock nut 52, by screwing the square-ended screw 50 in or out in the spherical nut 51, the casing G of the optical system being thereby displaced in the telescope holder T.

Figure 23, is a view looking towards the eyepiece, and shows a prismatic telescope provided with another construction of the adjusting device, Figure 24 shows the details of the ball mounting.

In the constructions shown in Figures 18 to 22, the casing G and the telescope holder T constitute the bearing for the two connecting spherical screws acting as movement elements, whereas according to Figure 23 the optical casing G is provided with three ball pivots 55, the movement element being a piston-like adjusting pin mounted in the telescope holder. The telescope holder T is provided with three circular projections $T_1$, $T_2$, $T_3$ corresponding to the three bearing points I, II and III and open on the side facing the casing of the optical system. The said projections are provided with cylindrical recesses parallel to the optical axis and having a screw-threaded hole in their bottom, in which may be screwed a sleeve 56 provided with an external thread and square shoulder. The sleeve 56 acts as guide for the piston-like pin 57 which fits loosely in the recess and has one end embracing the ball pivot 55 of the casing of the optical system, while its other end carries an external screwthread. The two lock nuts 58 serve to fix the pin 57 in the sleeve 56, which at the same time acts as a neck journal bearing and indirect adjusting element, being in turn fixed in its position relatively to the telescope holder by the lock nut 59. The cap 60 acts as a protecting device.

Adjustment is effected, after removing the protective cap 60 and loosening the lock nut 59, by screwing the screw-threaded sleeve 56 in or out in the telescope holder T, the piston 57 and with it the ball pivot 55 and hence the casing G of the optical system being thereby moved forwards or backwards in the direction of the optical axis. After adjustment has been effected, the sleeve 56 is fixed by tightening the lock nut 59 and the ball pivot 55 is locked in position by means of the screw 61.

Figure 25 shows in section a construction which is mounted and fixable on two sides. The telescope holder T is provided with a through hole open on one side, in which hole the piston-like pin 62, having screw-threaded shanks 62a on either side, is mounted by means of the bearing plates 63. Lock nuts 64 are provided for fixing. Adjustment is effected, after slackening the nuts 64, by displacement of the pin 62.

It will be pointed out once more that all three bearing points I, II, III always have, of course, the same construction. It is obvious that the guiding surfaces for the pin 6 instead of being provided in the holder of the telescope may be provided in the supporting rail for the holder.

I claim:

1. In a prismatic sighting telescope in combination, a fixed graticule, a telescope holder, a support for said holder, a pivot joint arranged between said holder and said support, a carrier pin in parallel relationship of its axis with the axis of said pivot joint and connecting said holder and said support, guiding surfaces provided for said carrier pin connecting said holder and said support, and means for moving said pin relatively to said guiding surfaces and adapting said holder and said support to rotate relatively to each other about said pivot joint in accordance with the movements of said carrier pin.

2. In a prismatic sighting telescope in combination, a fixed graticule, a telescope holder, a support for said holder, a pivot joint arranged between said holder and said support, a carrier pin in parallel relationship of its axis with the axis of said pivot joint and connecting said holder and said support, guiding surfaces provided on said holder for said carrier pin and means for moving said pin relatively to said guiding surfaces and adapting the part of said holder carrying said guiding surfaces to move perpendicularly to said surfaces for turning the holder about said pivot joint in accordance with the movements of said carrier pin.

3. In a prismatic sighting telescope, in combination, a fixed graticule, a telescope holder, a foot on said holder provided with a guide slot, a support for said holder a pivot joint arranged between said holder and said support, a rail portion on said support, two guides on said rail portion for guiding said foot of said holder therebetween, a carrier pin displaceably arranged in said guide slot in the foot of said holder in parallel relationship of its axis with the axis of said pivot joint for connecting said holder to said support, and means for moving said carrier pin longitudinally of said guide slot and adapting said holder to turn about said pivot joint in accordance with the movements of said carrier pin.

4. In a prismatic sighting telescope, in combination, a fixed graticule, a telescope holder, a foot on said holder provided with a guide slot, extending parallel to the optical axis of the telescope, a support for said holder, a pivot joint arranged between said holder and said support, a rail portion on said support, two guides on said rail portion for guiding said foot of said holder therebetween and each provided adjacent said guide slot in the foot of said holder with guide slots inclined in accordance with the projectile trajectory of the gun with which the telescope is combined, a carrier pin passed through said three slots and displaceably arranged therein in parallel relationship of its axis with the axis of said pivot joint, a reference mark on said carrier pin, a graduated scale provided along one of said inclined slots in the respective guide of said rail portion and cooperating with said reference mark for indicating the elevation, and an adjusting screw rotatably mounted in the foot of said holder for displacing said carrier pin lengthwise of said three slots for effecting a displacement of the foot slot relatively to the slots in said guides and a corresponding inclination of the telescope in accordance with the desired elevation.

5. In a prismatic sighting telescope, in combination, a fixed graticule, a telescope holder, a foot on said holder provided with a guide slot, a support for said holder, a pivot joint arranged between said holder and said support, a rail portion on said support, two guides on said rail portion for guiding said foot of said holder therebetween, a carrier pin displaceably arranged in said guide slot in the foot of said holder in parallel relationship of its axis with the axis of said pivot joint for connecting said holder to said support, a flat spring secured to the rail portion on said support below the foot of the holder and bearing against the lower edge of the foot, a free end on said spring for pressing said foot upwardly for completely eliminating the play of said supporting pin in the guide slot of said foot, and means for moving said carrier pin longitudinally of said guide slot and adapting said holder to turn about said pivot joint in accordance with the movements of said carrier pin.

6. In a prismatic sighting telescope, in combination, a fixed graticule, a telescope holder, a foot on said holder provided with a guide slot, a support for said holder, a pivot joint arranged between said holder and said support, a rail portion on said support two guides on said rail portion for guiding said foot of said holder therebetween, a carrier pin displaceably arranged in said guide slot in the foot of said holder in parallel relationship of its axis with the axis of said pivot joint for connecting said holder to said support, a flat spring secured to the rail portion on said support below the foot of the holder and bearing against the lower edge of the foot, a free end on said spring for pressing said foot upwardly for completely eliminating the play of said supporting pin in the guide slot of said foot, an extension on said flat spring, an eccentric pin mounted in said rail portion on said support for cooperation with said extension on said spring, a control catch for said eccentric enabling eliminating the pressure exertion of said spring on said foot, and means for moving said carrier pin longitudinally of said guide slot and adapting said holder to turn about said pivot joint in accordance with the movements of said carrier pin.

7. In a prismatic sighting telescope in combination, a fixed graticule, a telescope holder, a support for said holder, a pivot joint arranged between said holder and said support, a rotatable carrier pin in parallel relationship of its axis with the axis of said pivot joint and connecting said holding and said supporting parts of the telescope, an eccentric portion on said carrier pin, guiding surfaces forming the side of a straight guide slot provided with its axis in parallel relationship with the optical axis of the telescope in that one of said parts in the latter which cooperates with said eccentric portion of said pin and slidably engaging said eccentric portion, and control means for said carrier pin for rotationally displacing said eccentric portion in said slot and accordingly rotating said holder and said support relatively to each other.

8. In a prismatic sighting telescope in combination, a fixed graticule, a telescope holder, a support for said holder, a pivot joint arranged between said holder and said support, a rotatable carrier pin in parallel relationship of its axis with the axis of said pivot joint and connecting said holding and said supporting parts of the telescope, an eccentric portion on said carrier pin, guiding surfaces forming the sides of a straight guide slot provided with its axis in parallel relationship with the optical axis of the telescope in that one of said parts in the latter which cooperates with said eccentric portion of said pin and slidably engaging said eccentric portion, an adjusting member for said carrier pin for rotationally displacing said eccentric portion of said pin in said slot, and a spring-pressed locking member provided on said adjusting member for securing the same in the position of adjustment of the relatively rotatable parts of the telescope providing a desired inclination of the holding part of the telescope and the axis of the latter relatively to the barrel of the fire-arm with which the telescope is combined by engagement of the locking member in a hole of a series of holes formed in that part of the telescope in which said pin is mounted.

9. In a prismatic sighting telescope, in combination, a fixed graticule, a telescope holder, a foot on said holder, a support for said holder, a pivot joint arranged between said holder and said support, a rail portion on said support, two guides on said rail portion for guiding said foot of said holder therebetween, a rotatable carrier pin in parallel relationship of its axis with the axis of said pivot joint and connecting said holder and said supporting rail of the telescope, an eccentric portion on said carrier pin, guiding surfaces forming the sides of a straight guide slot provided with its axis in parallel relationship with the optical axis of the telescope in said foot of said holder and slidably engaging said eccentric portion, a control lever for said carrier pin for rotationally displacing said eccentric portion of said pin in said slot, a spring-pressed locking member provided on said adjusting member for securing the same in the position of adjustment of said holder and said supporting rail providing a desired inclination of the holder and the axis of the telescope relatively to the barrel of the fire-arm with which the telescope is combined by engagement of the locking member in a hole of a series of holes formed in said rail portion, a reference mark on said control lever, and a scale provided on the end face of said supporting rail cooperating with said reference mark for reading and adjusting the elevation.

10. In a prismatic sighting telescope, in combination, a fixed graticule, a casing enclosing said graticule and the optical system of the telescope, a telescope holder movably accommodating said casing, a three-point ball mounting provided in said holder for said casing for adjusting the optical system, three connecting screws having spherical portions for connecting said casing and said holder and extending in the direction of the optical axis, seats arranged in said holder for engaging the spherical portions of said screws, means for fixing said screws in said seats in said holder, a support for said holder, a pivot joint arranged between said holder and said support, a carrier pin in parallel relationship of its axis with the axis of said pivot joint and connecting said holder and said support, guiding surfaces making a small angle with each other provided for said carrier pin connecting said holder and said support, and means for moving said pin relatively to said guiding surfaces and adapting said holder and said support to rotate relatively to each other about said pivot joint in accordance with the movements of said carrier pin.

11. In a prismatic sighting telescope according to claim 10, means for jointedly clamping the three spherical screws in said casing.

12. In a prismatic sighting telescope, in combination, a fixed graticule, a casing enclosing said graticule and the optical system of the telescope, a telescope holder movably accommodating said casing, a three-point ball mounting provided in said holder for said casing for adjusting the optical system, three square-ended spherical connecting screws for said casing and said holder and situated in the direction of the optical axis, a portion on the shank of each of said screws being threaded a spherical or spherical segment-shaped collar respectively on each of said screws, a concave seat arranged in said holder for each screw for receiving said collar thereof, a concave bushing for jointedly clamping said screws in said concave seats of said holder, a bushing provided in said casing for each screw for rigidly engaging said threaded portion on the shank of the screw, means for securing said screw shanks in the respective bushings, a support for said holder, a pivot joint arranged between said holder and said support, a carrier pin in parallel relationship of its axis with the axis of said pivot joint and connecting said holder and said support, guiding surfaces positioned at an angle with each other provided for said carrier pin connecting said holder and said support, and means for moving said pin relatively to said guiding surfaces and adapting said holder and said support to rotate relatively to each other about said pivot joint in accordance with the movements of said carrier pin.

13. In a prismatic sighting telescope, in combination, a fixed graticule, a casing enclosing said graticule and the optical system of the telescope, a telescope holder movably accommodating said casing, a three-point ball mounting provided in said holder for said casing for adjusting the optical system, three connecting pins for said casing and said holder and situated in the direction of the optical axis, the pins being slidably guided in recesses of the holder, means adapting said pins to act as movement and locking members for said three ball pivots for said casing, a support for said holder, a pivot joint arranged between said holder and said support, a carrier pin in parallel relationship of its axis with the axis of said pivot joint and connecting said holder and said support, guiding surfaces positioned at an angle with each other provided for said carrier pin connecting said holder and said support, and means for moving said pin relatively to said guiding surfaces and adapting said holder and said support to rotate relatively to each other about said pivot joint in accordance with the movements of said carrier pin.

14. In a prismatic sighting telescope, in combination, a fixed graticule, a casing enclosing said graticule and the optical system of the telescope, a telescope holder movably accommodating said casing, a three-point ball mounting provided in said holder for said casing for adjusting the optical system, three connecting pins for said casing and said holder and situated in the direction of the optical axis for guiding said three ball pivots, the connecting pins being slidably guided in recess of the holder, screwable mounting sleeves for adjusting said connecting pins in said holder, lock nuts for securing said connecting pins in position in the mounting sleeve, means for locking said ball pivots in position in said casing, a support for said holder, a pivot joint arranged between said holder and said support, a carrier pin in parallel relationship of its axis with the axis of said pivot joint and connecting said holder and said support, guiding surfaces positioned at an angle with each other provided for said carrier pin connecting said holder and said support, and means for moving said pin relatively to said guiding surfaces and adapting said holder and said support to rotate relatively to each other about said pivot joint in accordance with the movements of said carrier pin.

15. In a prismatic sighting telescope, in combination, a fixed graticule, a casing enclosing said graticule and the optical system of the telescope, a telescope holder movably accommodating said casing, a three-point ball mounting provided in said holder for said casing for adjusting the optical system, three connecting pins for said casing and said holder and situated in the direction of the optical axis for guiding said three ball pivots, the connecting pins being slidably guided in recesses of the holder, two shank portions for said piston like pins disposed on either side of the ball pivot, a bearing plate for each shank portion of said piston-like pins, means for adjusting said piston-like pins relatively to said bearing plates, means for locking said ball pivots in position in said casing, a support for said holder, a pivot joint arranged between said holder and said support, a carrier pin in parallel relationship of its axis with the axis of said pivot joint and connecting said holder and said support, guiding surfaces positioned at an angle with each other provided for said carrier pin connecting said holder and said support, and means for moving said pin relatively to said guiding surfaces and adapting said holder and said support to rotate relatively to each other about said pivot joint in accordance with the movements of said carrier pin.

16. In a prismatic sighting telescope, in combination, a fixed graticule, a telescope holder, a foot on said holder provided with a guide slot extending perpendicularly to the optical axis of the telescope, a support for said holder, a pivot joint arranged between the holder and the support, a rail portion on said support, two guides on said rail portion for guiding said foot of the holder therebetween and each provided adjacent said guide slot in the foot of said holder with guide slots inclined in accordance with the projectile trajectory of the gun with which the telescope is combined, a carrier pin passed through said three slots and displaceably arranged therein in parallel relationship of its axis with the axis of said pivot joint, a reference mark on said carrier pin, a graduated scale provided along one of the said inclined slots in the corresponding guide of said rail portion and cooperating with said reference mark for indicating the elevation, and an adjusting screw rotatably mounted in the foot of said holder for displacing said carrier pin lengthwise of said three slots for effecting a displacement of the foot slot relatively to the slots in said guides and a corresponding inclination of the telescope in accordance with the desired elevation.

17. In a prismatic sighting telescope, in combination, a fixed graticule, a telescope holder, a foot on said holder, a support for said holder, a pivot joint arranged between said holder and said support, a rail portion on said support, two guides on said rail portion for guiding said foot of said holder therebetween, a rotatable carrier pin in parallel relationship of its axis with the axis of said pivot joint and connecting said holder and said supporting rail of the telescope, an eccentric portion on said carrier pin, guiding surfaces forming the sides of a straight guide slot provided with its axis in vertical relationship with the optical axis of the telescope in said foot of said holder and slidably engaging said eccentric portion, a control means for said carrier pin for rotatably displacing said eccentric portion of said pin in said slot, said supporting rail permitting a desired inclination of the holder and the axis of the telescope relatively to the barrel of the fire-arm with which the telescope is combined by rotational displacement of said carrier pin, a reference mark on the end face of said supporting rail, and a scale provided on the said control means cooperating with said reference mark for indicating and adjusting the elevation.

18. In a prismatic sighting telescope, in combination, a fixed graticule, a casing enclosing said graticule and the optical system of the telescope, a telescope holder movably accommodating said casing, a three-point ball mounting provided in said holder for said casing for adjusting the optical system, three square-ended spherical connecting screws for said casing and said holder and situated in the direction of the optical axis, a threaded portion on the shank of each of said screws, a spherical portion on each of said screws, a concave seat arranged in said holder for each screw for receiving said portion, a concave bushing for adjustably clamping said screws in said concave seats of said holder, a bushing provided in said casing for each screw, a spherical nut adjustably positioned in each of said last-named bushings for rigidly engaging said threaded portion on the shank of the screw, means for securing the spherical nuts in said last-named bushings, a support for said holder, a pivot joint arranged between said holder and said support, a carrier pin in parallel relationship of its axis with the axis of said pivot joint and connecting said holder and said support, guiding surfaces positioned at an angle with each other provided for said carrier pin connecting said holder and said support, and means for moving said pin relatively to said guiding surfaces and adapting said holder and said support to rotate relatively to each other about said pivot joint in accordance with the movements of said carrier pin.

KARL JUNG.